United States Patent
Yoon

(10) Patent No.: US 7,713,344 B2
(45) Date of Patent: May 11, 2010

(54) LIQUID FORMULATIONS FOR SEALING OF CRACKS IN INTERNAL COMBUSTION ENGINE COOLING SYSTEMS

(75) Inventor: Soyeong Yoon, Yongin-Si (KR)

(73) Assignee: Duraseal Co., Inc., Chungcheongbuk-Do (KR)

( * ) Notice: Subject to any disclaimer, the term of this patent is extended or adjusted under 35 U.S.C. 154(b) by 455 days.

(21) Appl. No.: 11/815,066

(22) PCT Filed: Feb. 18, 2006

(86) PCT No.: PCT/KR2006/000563

§ 371 (c)(1),
(2), (4) Date: Jul. 30, 2007

(87) PCT Pub. No.: WO2006/088335

PCT Pub. Date: Aug. 24, 2006

(65) Prior Publication Data

US 2008/0087195 A1    Apr. 17, 2008

(30) Foreign Application Priority Data

Feb. 21, 2005    (KR) ............... 10-2005-0014040

(51) Int. Cl.
*C09K 3/12* (2006.01)
(52) U.S. Cl. ........... 106/33; 106/194.2; 106/197.01
(58) Field of Classification Search ............ 106/33, 106/194.2, 197.01, 198.1
See application file for complete search history.

(56) References Cited

U.S. PATENT DOCUMENTS

| | | | |
|---|---|---|---|
| 4,973,360 A * | 11/1990 | Satas ............... | 106/33 |
| 5,772,747 A * | 6/1998 | Turner et al. ........ | 106/33 |
| 6,767,395 B2 * | 7/2004 | Erick ............... | 106/33 |
| 6,840,990 B2 * | 1/2005 | Gallagher et al. ...... | 106/33 |
| 2003/0047111 A1 * | 3/2003 | Niume et al. ........ | 106/190.1 |

* cited by examiner

*Primary Examiner*—David M Brunsman
(74) *Attorney, Agent, or Firm*—IPLA P.A.; James E. Bame

(57) ABSTRACT

Complete liquid formulations, that can seal up cracks on metal surfaces of devices participating in cooling of internal combustion engines and are composed of water soluble fibrous macromolecules, nanometer size metals, and silicon dioxide, are disclosed.

3 Claims, No Drawings

LIQUID FORMULATIONS FOR SEALING OF CRACKS IN INTERNAL COMBUSTION ENGINE COOLING SYSTEMS

This application is a 371 filing of PCT/KR06/00563, filed Feb. 18, 2006.

TECHNICAL FIELD

Chemical methods for sealing of cracks on metal surfaces.

BACKGROUND ART

Cooling system devices that dissipate heat generated by burning of fuel compulsorily exist in internal combustion engines. All the engines that use gas, kerosene, gasoline, and diesel as fuel belong to the internal combustion engines. For example, the cooling system of an automobile uses coolant solution composed mainly of glycols, and excessive overheating of engine by leakage and depletion of coolant by any means can shorten durability of the engine and cause metallic cracks on the engine parts.

Cracks, openings, and microscopic holes on a radiator, cylinder block, cylinder head, and cylinder head gasket participating in cooling of internal combustion engines, cause waste of unnecessary resources and economical defrayment of consumers when no other methods are available but replacing the relevant parts as the sole solution.

There have been efforts to repair cracks of internal combustion engines without disassembling and replacing damaged devices, and several products are commercialized and marketed. One such representative example of using sodium silicate, main ingredient of majority of currently marketed crack repairing products, can be found in U.S. Pat. No. 4,708, 195 (1987). Sealing formulation of 95.8% sodium silicate, 4.1% water, 0.16% cupric sulfate pentahydrate, and 0.005% arabic gum has been disclosed. In another U.S. Pat. No. 4,765,629 (1988) described a sealing system composed of a liquid carrier and solid particles, a liquid carrier composed of water and sodium silicate, and solid particles selected from silver solder flakes, lead solder flakes and pure ground pepper, and solidifying at 150° F. in the crack. In still another application, U.S. Pat. No. 4,973,360 (1990) expanded on the kinds of silicates in addition to sodium or potassium silicate already in use, and disclosed a sealant solution composed of 25% water, 25% ethylene glycol, and 50% aqueous solution composed of compounds selected from silicates of lithium, ammonium, rubidium, cesium, and germanium, and oxides of sodium oxide with aluminum oxide, calcium oxide or magnesium oxide. Synthetic polymer polyacrylic acid was first described in U.S. Pat. No. 6,767,395 (2004). In that application, a liquid aluminum stop-leak formulation comprising water, polyacrylic acid, cellulose fibers of 0.075~0.3 mm, polyester fiber of 0.3 mm, aluminum particles of about 32☐, and other components are disclosed. In U.S. Pat. No. 6,840,990, a sealing composition incorporating sodium nitrate or azoles as corrosion inhibitors is described.

DISCLOSURE OF INVENTION

Technical Problem

Any formulations by prior arts described above can not offer complete liquid formulations by contain metals of large particle size or less water soluble polymers. Complete liquid formulation improves simplicity of manufacturing process and uniformity of composition of manufactured formulation, and increases convenience of end user application.

Technical Solution

To solve technological problems hindering complete liquid crack sealing formulation, the inventor tested various ingredients in detail and estimated sealing performance and succeeded in achieving complete liquid formulation of high sealing activity for cracks in metal parts.

Advantageous Effects

Formulation by present invention offer complete liquid composition that can seal up mechanical defects generated by cracks of cooling systems of internal combustion engines without need to disassemble and replace relevant parts.

Best Mode for Carrying Out the Invention

Liquid formulation by present invention is composed of silica, fibrous polymers, oxidizing agents, and metals of nanometer size. Formulation by present invention contains silica among which silicon dioxide form is favored, and contains 5 to 90% (w/v) colloidal silica with 5 to 60% (w/v) silicon dioxide and less than 1% (w/v) sodium oxide content. Silica plays direct role in sealing up cracks with other ingredients of said formulation by permeating into crack region and the subsequent sealing induced by high temperature of coolant while dispersing and circulating in cooling water of internal combustion engines. Sodium or potassium salts of silicate aggregate with glycols in antifreeze solution when mixed and encounter high coolant temperature, user have to thoroughly wash and replace existing coolant containing glycols with water, which is labor intensive process. Incorporating high purity silicon dioxide with less than 1% (w/w) sodium oxide content in said liquid formulation, intensity of sealing can be increased, and ethylene glycol or propylene glycol can be added to said liquid formulation to prevent self-aggregation of silica during storage under freezing temperature, and furthermore, user can pour said liquid formulation directly to coolant containing glycol antifreeze without replacing the said glycol containing coolant.

Said crack sealing liquid formulation contains 0.01 to 10% (w/v), more desirably 0.5 to 5% (w/v) of fibrous polymers. At least one fibrous polymer can be selected from water soluble polymers such as methyl cellulose, hydroxyethyl cellulose, hydroxypropylmethyl cellulose, carboxymethyl cellulose, and derivatives of said water soluble fibrous polymers with various molecular weights. Water soluble cellulose derivatives of various molecular weights influence viscosity of said liquid formulation, and also participate in sealing up cracks of various degrees of size.

For said liquid formulation, at least one oxidizing agent can be selected from nitrates including sodium nitrate, potassium nitrate, ammonium nitrate, silver nitrate, ferrous nitrate, aluminum nitrate, and cupric nitrate, and nitrites including sodium nitrite, potassium nitrite, calcium nitrite, and zinc nitrite. Concentration of oxidizing agents in said liquid formulation is to be 0.01 to 5% (w/v), or more desirably 0.1 to 1% (w/v). Oxidizing agents promote polymerization of silica and increase strength of sealing by silica above 80° C. For preventing aggregation of said oxidizing agents with silica by changes of concentration of hydrogen ions during mixing, said oxidizing agents can be premixed with appropriate amounts of ethylenediaminetetraacetic acid.

For said liquid crack sealing formulation, at least one metal powder of 1 to 1000 nanometers, desirably 1 to 100 nanometers, and more desirably 1 to 10 nanometers in size, without sinking and sustaining uniform density in said liquid formulation, can be selected from silver, gold, copper, aluminum, plumbum, ferrum, stannum, nickel, manganese, magnesium, titanium, brass, bronze, nichrome, ferrous chrome, duralumin, stainless steel, titanium alloy and alloys of said metals, and metal oxides of iron oxide, copper oxide, aluminum oxide, titanium oxide, zinc oxide, manganese oxide, magnesium oxide, and lead oxide. These metals, metal alloys and metal oxides increase mechanical strength of sealing of cracks, and further transmit heat to neighborhood of a crack site and prevent spread of crack.

And also, said crack sealing liquid formulation can contain 10 to 50% (w/v) of ethylene glycol or propylene glycol to prevent irreversible self-aggregation of silica during storage under freezing temperature. The invention will be explained in more detail in the following examples which obviously do not limit the scope of the present invention.

Table 1 shows the compositions of complete liquid formulations for sealing up cracks of cooling system of internal combustion engines, and can be manufactured by adding each ingredient under appropriate stirring.

hydroxypropylmethyl cellulose, carboxymethyl cellulose, and derivatives of said water soluble fibrous polymers with various molecular weights. Water soluble cellulose derivatives of various molecular weights influence viscosity of said liquid formulation, and also participate in sealing up cracks of various degrees of size.

For said liquid crack sealing formulation, at least one metal powder of 1 to 1000 nanometers, desirably 1 to 100 nanometers, and more desirably 1 to 10 nanometers in size, without sinking and sustaining uniform density in said liquid formulation, can be selected from silver, gold, copper, aluminum, plumbum, ferrum, stannum, nickel, manganese, magnesium, titanium, brass, bronze, nichrome, ferrous chrome, duralumin, stainless steel, titanium alloy and alloys of said metals, and metal oxides of iron oxide, copper oxide, aluminum oxide, titanium oxide, zinc oxide, manganese oxide, magnesium oxide, and lead oxide. These metals, metal alloys and metal oxides increase mechanical strength of sealing of

TABLE 1

| concentration (w/v %) | example 1 | example 2 | example 3 | example 4 | example 5 |
|---|---|---|---|---|---|
| silicon dioxide | 30 | 40 | 50 | 40 | 50 |
| carboxymethyl cellulose | 0.5 | | | 1 | |
| hydroxyethyl cellulose | | | 1 | | 1 |
| hydroxypropylmethyl cellulose | 2 | | | 1 | |
| aluminium nitrate | 0.5 | | 0.5 | | 0.5 |
| sodium nitrate | | 1 | | 1 | |
| cupric nitrate | | | | | 0.2 |
| silver nano powder | 0.5 | 1.0 | | | |
| copper nano powder | | | 0.3 | 0.5 | 0.5 |
| monoethylene glycol | 20 | 20 | 30 | | |
| propylene glycol | | | | 25 | 25 |
| distilled water (added to final 100 ml) | proper quantity | proper quantity | proper quantity | proper quantity | proper quantity |

Mode For The Invention

Liquid formulation by present invention is composed of silica, fibrous polymers, oxidizing agents, and metals of nanometer size. Formulation by present invention contains silica among which silicon dioxide form is favored, and contains 5 to 90% (w/v) colloidal silica with 5 to 60% (w/v) silicon dioxide and less than 1% (w/v) sodium oxide content. Silica plays direct role in sealing up cracks with other ingredients of said formulation by permeating into crack region and the subsequent sealing induced by high temperature of coolant while dispersing and circulating in cooling water of internal combustion engines. Sodium or potassium salts of silicate aggregate with glycols in antifreeze solution when mixed and encounter high coolant temperature, user have to thoroughly wash and replace existing coolant containing glycols with water, which is labor intensive process. Incorporating high purity silicon dioxide with less than 1% (w/w) sodium oxide content in said liquid formulation, intensity of sealing can be increased, and ethylene glycol or propylene glycol can be added to said liquid formulation to prevent self-aggregation of silica during storage under freezing temperature, and furthermore, user can pour said liquid formulation directly to coolant containing glycol antifreeze without replacing the said glycol containing coolant.

Said crack sealing liquid formulation contains 0.01 to 10% (w/v), more desirably 0.5 to 5% (w/v) of fibrous polymers. At least one fibrous polymer can be selected from water soluble polymers such as methyl cellulose, hydroxyethyl cellulose, cracks, and further transmit heat to neighborhood of a crack site and prevent spread of crack.

INDUSTRIAL APPLICABILITY

Formulation by this invention as perfect liquid solution offer method for sealing up mechanical defect generated by cracks in cooling systems of internal combustion engines without disassembling of internal combustion engines. Liquid formulation by this invention achieves the purpose of sealing up cracks by using generally 1 part of formulation to 20 parts of total coolant used. As the said formulation can seal up rupture of metallic parts contacting cooling water without disassembling of relevant devices of transport vehicles such as automobiles, motorcycles, trains, and ships as well as industrial boiler, and cooling system of reaction tanks, epoch-making curtailment of maintenance expenses and increase of durability of devices are possible, and ultimately, can contribute in energy saving of related industries.

The invention claimed is:

1. A complete liquid formulation that can seal up cracks, holes and openings of cooling system devices of internal combustion engines containing; 0.01 to 10% (w/v) of at least one macromolecule of various molecular weights selected from methyl cellulose, hydroxyethyl cellulose, hydroxypropylmethyl cellulose, carboxymethyl cellulose; and 0.3 to 1.0% (w/v) of more than one metal of less than 100 nm in size selected from silver, gold, copper, aluminum, plumbum, ferrum, stannum, nickel, manganese, magnesium, titanium, and metallic alloys and metallic oxides of said metals; and 5 to 50% (w/v) of silicon dioxide.

2. The formulation as defined in claim 1, further containing 0.01 to 5% (w/v) of at least one oxidizing agent selected from nitrates including sodium nitrate, potassium nitrate, ammonium nitrate, silver nitrate, ferrous nitrate, aluminum nitrate, and cupric nitrate, or nitrites including sodium nitrite, potassium nitrite, calcium nitrite, and zinc nitrite.

3. The formulation as defined in claim 1, further containing 10 to 50% (w/v) of ethylene glycol or propylene glycol to prevent irreversible self-aggregation of silica during the storage under freezing temperature.

* * * * *